United States Patent
Jang et al.

(10) Patent No.: US 9,100,954 B2
(45) Date of Patent: Aug. 4, 2015

(54) METHOD FOR TRANSMITTING RESPONSE INFORMATION IN A WIRELESS COMMUNICATION SYSTEM, AND APPARATUS FOR SAME

(75) Inventors: Jiwoong Jang, Anyang-si (KR);
Seunghee Han, Anyang-si (KR);
Jaehoon Chung, Anyang-si (KR);
Jinmin Kim, Anyang-si (KR);
Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 13/808,869

(22) PCT Filed: Jul. 7, 2011

(86) PCT No.: PCT/KR2011/004974
§ 371 (c)(1),
(2), (4) Date: Jan. 7, 2013

(87) PCT Pub. No.: WO2012/005523
PCT Pub. Date: Jan. 12, 2012

(65) Prior Publication Data
US 2013/0114477 A1 May 9, 2013

Related U.S. Application Data

(60) Provisional application No. 61/362,286, filed on Jul. 7, 2010.

(51) Int. Cl.
*H04W 72/04* (2009.01)
*H04L 1/00* (2006.01)
(Continued)

(52) U.S. Cl.
CPC ........... *H04W 72/042* (2013.01); *H04L 1/0073* (2013.01); *H04L 1/0075* (2013.01);
(Continued)

(58) Field of Classification Search
None
See application file for complete search history.

(56) References Cited

U.S. PATENT DOCUMENTS

2004/0132456 A1* 7/2004 Takeda et al. ................. 455/450
2008/0101303 A1* 5/2008 Kim .............................. 370/335
(Continued)

FOREIGN PATENT DOCUMENTS

KR 10-2008-0072488 A 8/2008
WO WO 2009/142436 A2 11/2009

OTHER PUBLICATIONS

Huawei, "A/N Codebook Design for Carrier Aggregation using Format 2 and DFT-S-OFDM," 3GPP TSG RAN WG1 meeting #61bis, R1-103886, Dresden, Germany Jun. 28-Jul. 2, 2010, 4 pages.
Nokia et al., "UL ACK/NAK Feedback for Power-Limited UE in LTE-A TDD," 3GPP TSG RAN WG1 Meeting #61bis, R1-103788, Dresden, Germany, Jun. 28-Jul. 2, 2010, 5 pages.

*Primary Examiner* — Dang Ton
*Assistant Examiner* — Ronald H Davis
(74) *Attorney, Agent, or Firm* — Birch, Stewart, Kolasch & Birch, LLP

(57) ABSTRACT

The present invention relates to a method for transmitting response information on downlink data through multiple information blocks to be bundled in a wireless system in a time division duplex (TDD) mode. The method for transmitting response information according to the present invention comprises the following steps: coding response information on the downlink data; scrambling the coded response information; and transmitting the scrambled response information to a base station, wherein, if a portion of the bits of the coded response information are information bits that indicate ACK/NACK on the downlink data, the scrambling step involves scrambling the coded response information using a specific scrambling sequence, and the specific scrambling sequence includes information on the number of information blocks to be bundled.

12 Claims, 17 Drawing Sheets

(51) Int. Cl.
*H04L 5/00* (2006.01)
*H04L 25/03* (2006.01)
*H04L 27/26* (2006.01)
*H04L 1/16* (2006.01)
*H04L 1/12* (2006.01)

(52) U.S. Cl.
CPC ............ *H04L1/1621* (2013.01); *H04L 1/1671* (2013.01); *H04L 5/0041* (2013.01); *H04L 25/03866* (2013.01); *H04L 27/2633* (2013.01); *H04L 27/2636* (2013.01); *H04L 1/0031* (2013.01); *H04L 2001/125* (2013.01)

(56) References Cited

U.S. PATENT DOCUMENTS

| | | | |
|---|---|---|---|
| 2008/0130548 A1* | 6/2008 | Kaikkonen et al. | 370/312 |
| 2009/0245421 A1* | 10/2009 | Montojo et al. | 375/298 |
| 2009/0268910 A1* | 10/2009 | Liu et al. | 380/268 |
| 2010/0034310 A1* | 2/2010 | Nam et al. | 375/267 |
| 2010/0091902 A1 | 4/2010 | Park et al. | |
| 2010/0195599 A1* | 8/2010 | Zhang et al. | 370/329 |
| 2011/0051824 A1 | 3/2011 | Kim et al. | |
| 2011/0280346 A1* | 11/2011 | Yang et al. | 375/341 |

* cited by examiner (a)

(b)

US 9,100,954 B2

METHOD FOR TRANSMITTING RESPONSE INFORMATION IN A WIRELESS COMMUNICATION SYSTEM, AND APPARATUS FOR SAME

This application is the National Phase of PCT/KR2011/004974 filed on Jul. 7, 2011, which claims priority under 35 U.S.C. 119(e) to U.S. Provisional Application No. 61/362,286 filed on Jul. 7, 2010, all of which are hereby expressly incorporated by reference into the present application.

TECHNICAL FIELD

The present invention relates to a wireless communication system, and more particularly, to a method for transmitting response information on downlink data through a plurality of information blocks bundled in a wireless system of a time division duplex (TDD) mode and an apparatus for the same.

BACKGROUND ART

In a mobile communication system, a user equipment (UE) may receive information from a base station (BS) in downlink and transmit information in uplink. The information transmitted or received by the UE includes data and a variety of control information, and a physical channel varies according to the type of information transmitted or received by the UE.

FIG. 1 is a view showing physical channels used for a $3^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a BS in step S101. In order to perform the initial cell search, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel from the BS and acquire broadcast information in the cell. Meanwhile, the UE may receive a Downlink Reference signal (DL RS) in the initial cell search step and confirm a downlink channel state.

The UE, upon completes the initial cell search, may receive a Physical Downlink Control Channel (PDCCH) and a Physical Downlink Shared Channel (PDSCH) corresponding to the PDCCH, and acquire more detailed system information in step S102.

Meanwhile, if the UE does not complete access to the BS, the UE may perform a random access procedure in steps S103 to S106, in order to complete access to the BS. In order to perform a random access procedure, the UE may transmit a feature sequence via a Physical Random Access Channel (PRACH) as a preamble (S103), and may receive a response message to the random access procedure via the PDCCH and the PDSCH corresponding thereto (S104). In contention-based random access, except for handover, a contention resolution procedure including transmission of an additional PRACH (S105) and reception of the PDCCH and the PDSCH corresponding thereto (S106) may be performed.

The UE, having performed the above-described procedure, may then receive the PDCCH/PDSCH (S107) and transmit a Physical Uplink Shared Channel (PUSCH)/Physical Uplink Control Channel (PUCCH) (S108), as a general uplink/downlink signal transmission procedure.

FIG. 2 is a view explaining a signal processing procedure for transmitting an uplink signal at a UE.

In order to transmit the uplink signal, a scrambling module 201 of the UE may scramble a transmitted signal using a UE-specific scrambling signal. The scrambled signal is input to a modulation mapper 202 so as to be modulated into complex symbols using Binary Phase Shift Keying (BPSK), Quadrature Phase Shift Keying (QPSK) or 16-Quadrature amplitude modulation (QAM) according to the kind of the transmitted signal and/or the channel state. Thereafter, the modulated complex symbols are processed by a transform precoder 203, and the processed complex symbols are input to a resource element mapper 204. The resource element mapper 204 may map the complex symbols to time-frequency resource elements used for actual transmission. The signal processed as described above may be transmitted to a BS via an SC-FDMA signal generator 205 and an antenna.

FIG. 3 is a view explaining a signal processing procedure for transmitting a downlink signal at a BS.

In the 3GPP LTE system, the BS may transmit one or more codewords in downlink. Accordingly, one or more codewords may be processed by scrambling modules 301 and modulation mappers 302 to configure complex symbols, similar to the uplink transmission of FIG. 2. Thereafter, the complex symbols are mapped to a plurality of layers by a layer mapper 303, and each layer may be multiplied by a predetermined precoding matrix, which is selected according to the channel state, by a precoding module 304 and may be allocated to each transmission antenna. The processed signals which will respectively be transmitted via antennas may be mapped to time-frequency resource elements used for transmission by resource element mappers 305, and may respectively be transmitted via OFDM signal generators 306 and antennas.

In a mobile communication system, in a case where a UE transmits a signal in uplink, a Peak-to-Average Ratio may be more problematic than the case where a BS transmits a signal in downlink. Accordingly, as described above with reference to FIGS. 2 and 3, downlink signal transmission uses an OFDMA scheme, while uplink signal transmission uses an SC-FDMA scheme.

FIG. 4 is a diagram explaining an SC-FDMA scheme for uplink signal transmission and an OFDMA scheme for downlink signal transmission in a mobile communication system.

A UE for uplink signal transmission and a BS for downlink signal transmission are identical in that a serial-to-parallel converter 401, a subcarrier mapper 403, an M-point Inverse Discrete Fourier Transform (IDFT) (or IFFT) module 404 and a Cyclic Prefix (CP) attaching module 406 are included. The UE for transmitting a signal using an SC-FDMA scheme further includes a parallel-to-serial converter 405 and an N-point DFT module 402. The N-point. DFT module 402 partially offsets an IDFT (or IFFT) process influence of the M-point IDFT (or IFFT) module 404 such that the transmitted signal has a single carrier property.

FIG. 5 is a diagram explaining a signal mapping scheme in a frequency region satisfying the single carrier property in the frequency region. FIG. 5(a) shows a localized mapping scheme and FIG. 5(b) shows a distributed mapping scheme. In the current 3GPP LTE system, a localized mapping scheme is defined.

A clustered SC-FDMA scheme which is a modified form of the SC-FDMA scheme will now be described. In the clustered SC-FDMA scheme, DFT process output samples are sequentially divided into sub-groups and are mapped to sub-carrier regions which are separated from each other on a per sub-group basis in an IFFT sample input unit in a subcarrier mapping process between a DFT process and an IFFT process. In some cases, a filtering process and a cyclic extension process may be included.

At this time, a sub-group may be called a cluster and cyclic extension means that a guard interval longer than maximum delay spread of a channel is inserted between contiguous symbols in order to prevent inter-symbol interference (ISI) while each subcarrier symbol is transmitted via a multi-path channel.

DISCLOSURE

Technical Problem

An object of the present invention is to provide a method for transmitting control information in a wireless communication system and an apparatus for the same.

The technical problems solved by the present invention are not limited to the above technical problems and other technical problems which are not described herein will become apparent to those skilled in the art from the following description.

Technical Solution

The object of the present invention can be achieved by providing a method for transmitting response information on downlink data through a plurality of bundled information blocks in a wireless system of a time division duplex (TDD) mode, including: coding the response information on the downlink data, scrambling the coded response information, and transmitting the scrambled response information to a base station, wherein, in the scrambling, if some bits of the coded response information are information bits indicating ACK/NACK of the downlink data, the coded response information b(i) is scrambled using a specific scrambling sequence according to the equation $$\tilde{b}(i)=(b(i)+c(i))\bmod 2$$

(where, b(i) denotes the coded response information, $\tilde{b}(i)$ denotes the scrambled response information, and c(i) denotes the specific scrambling sequence), and the specific scrambling sequence includes information about the number of bundled information blocks.

The specific scrambling sequence c(i) may be a pseudo-random sequence.

A start point of the specific scrambling sequence c(i) may be set according to the number of bundled information blocks. If the number of bundled information blocks is k, the start point of the specific scrambling sequence c(i) may be shifted by any one of c(i−k+1) or c(i+k−1). If the number of bundled information blocks is k, the start point of the specific scrambling sequence c(i) may be shifted by any one of c(i−a(k−1)) or c(i+a(k−1)). Here, a is an arbitrary constant. a may be any one of a factor of 2 or the length of the response information.

The transmitting may include transmitting the generated response information to the base station through a plurality of antennas, and the scrambling may include scrambling the coded response information using a specific scrambling sequence corresponding to each of the plurality of antennas.

In another aspect of the present invention, there is provided an apparatus for transmitting response information on downlink data through a plurality of bundled information blocks in a wireless system of a time division duplex (TDD) mode, including a coding module configured to code the response information on the downlink data, a scrambling module configured to scramble the coded response information, and a radio frequency (RF) module configured to transmit the scrambled response information to a base station, wherein, if some bits of the coded response information are information bits indicating ACK/NACK of the downlink data, the scrambling module scrambles the coded response information b(i) using a specific scrambling sequence according to the equation $$\tilde{b}(i)=(b(i)+c(i))\bmod 2,$$

and the specific scrambling sequence includes information about the number of bundled information blocks.

Advantageous Effects

According to a communication system of the present invention, it is possible to check the number of bundled ACK/NACK blocks through one scrambling process in a TDD mode using different scrambling sequences used for ACK/NACK scrambling other than a scrambling sequence used for bundling.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

The configuration, operation and other features of the present invention will be understood by the embodiments of the present invention described with reference to the accompanying drawings. The following embodiments are examples of applying the technical features of the present invention to a system using a plurality of orthogonal subcarriers. Although, for convenience, the present invention is described using a 3$^{rd}$ Generation Partnership Project (3GPP) system, the present invention is applicable to various wireless communication systems including an IEEE 802.16 system.

It should be noted that specific terms disclosed in the present invention are proposed for the convenience of description and better understanding of the present invention, and the use of these specific terms may be changed to another format within the technical scope or spirit of the present invention.

Figure 1:
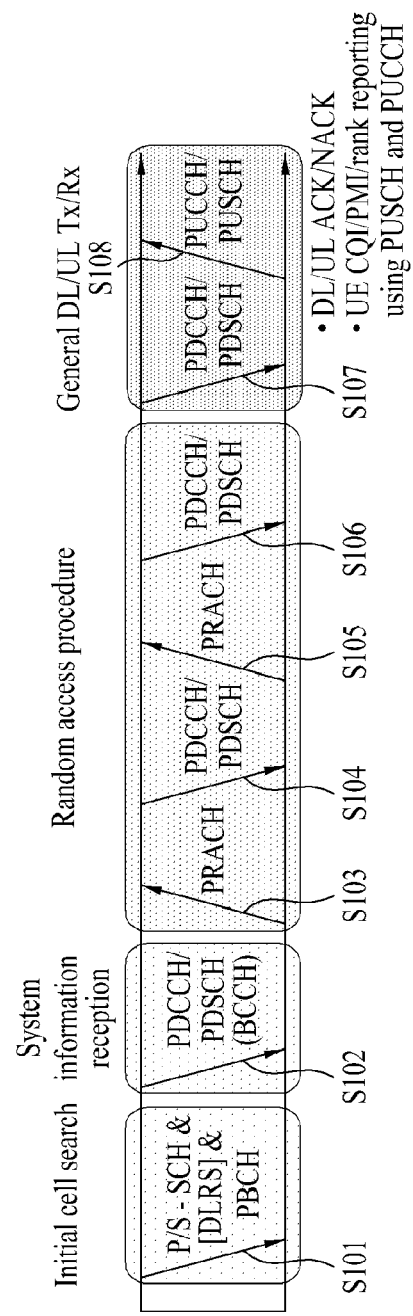
FIG. 1 is a view showing physical channels used for a $3^{rd}$ Generation Partnership Project (3GPP) Long Term Evolution (LTE) system which is an example of a mobile communication system and a general signal transmission method using the same.
Figure 2:
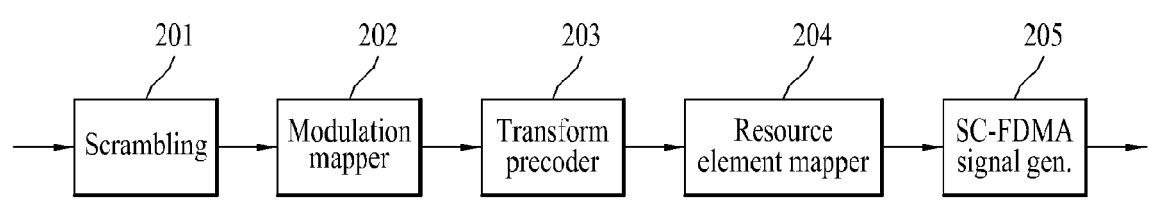
FIG. 2 is a view explaining a signal processing procedure of transmitting an uplink (UL) signal at a UE.
Figure 3:
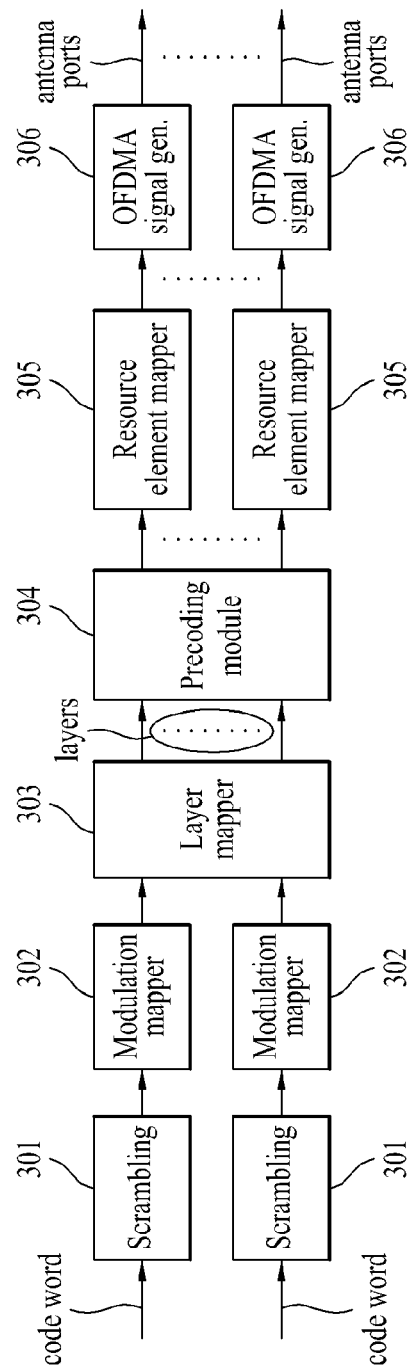
FIG. 3 is a diagram explaining a signal processing procedure of transmitting a downlink (DL) signal at a base station (BS).
Figure 4:
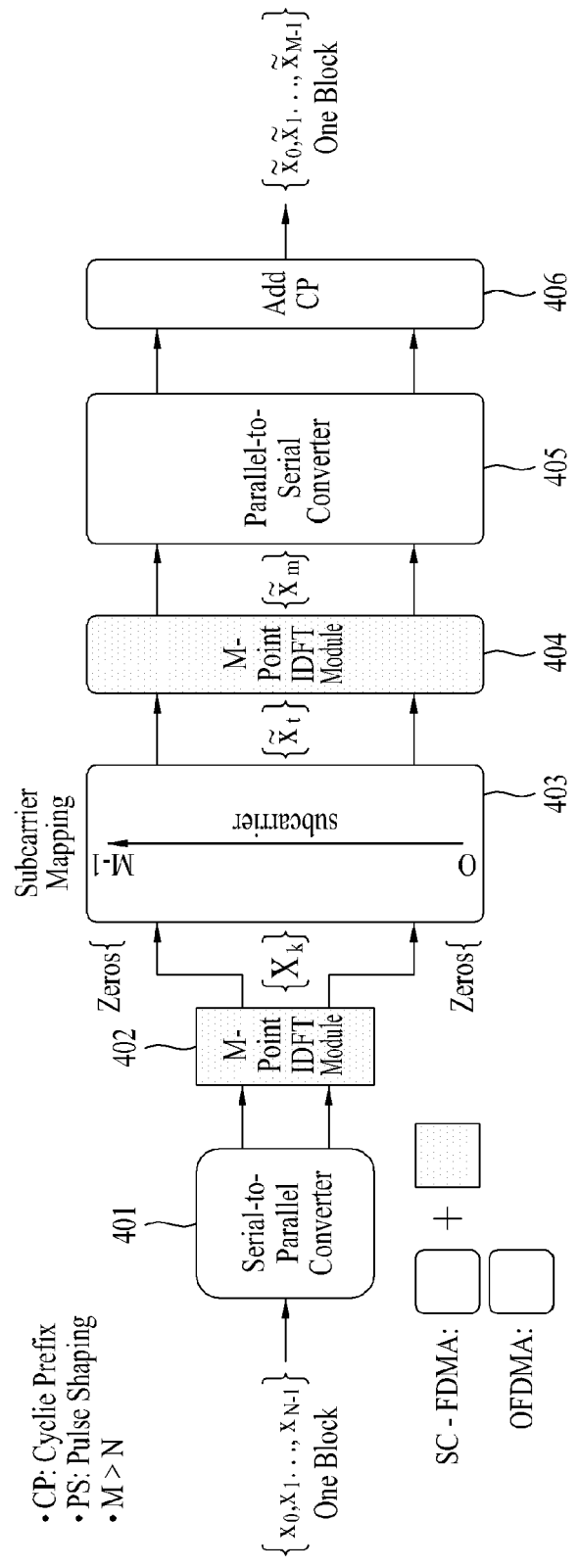
FIG. 4 is a diagram explaining an SC-FDMA scheme for transmitting an uplink signal and an OFDMA scheme for transmitting a downlink signal in a mobile communication system.
Figure 5:
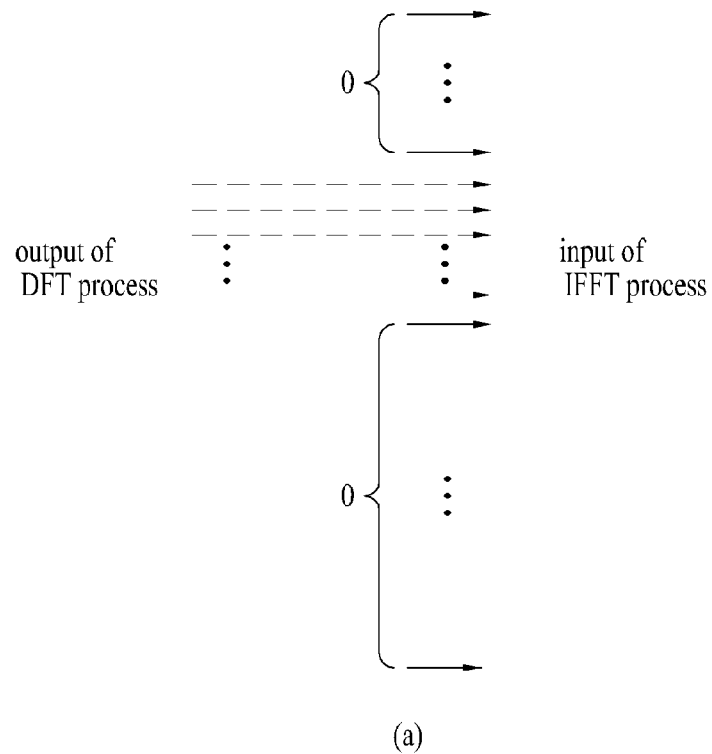
FIG. 5 is a diagram explaining a signal mapping scheme in a frequency domain satisfying a single carrier property in the frequency domain.
Figure 5:
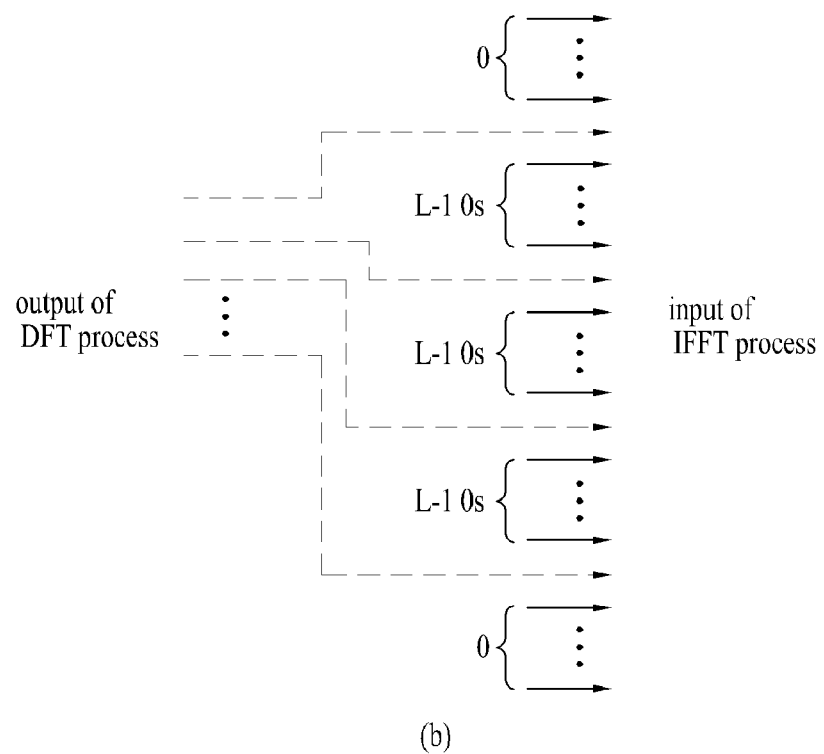
Figure 6:
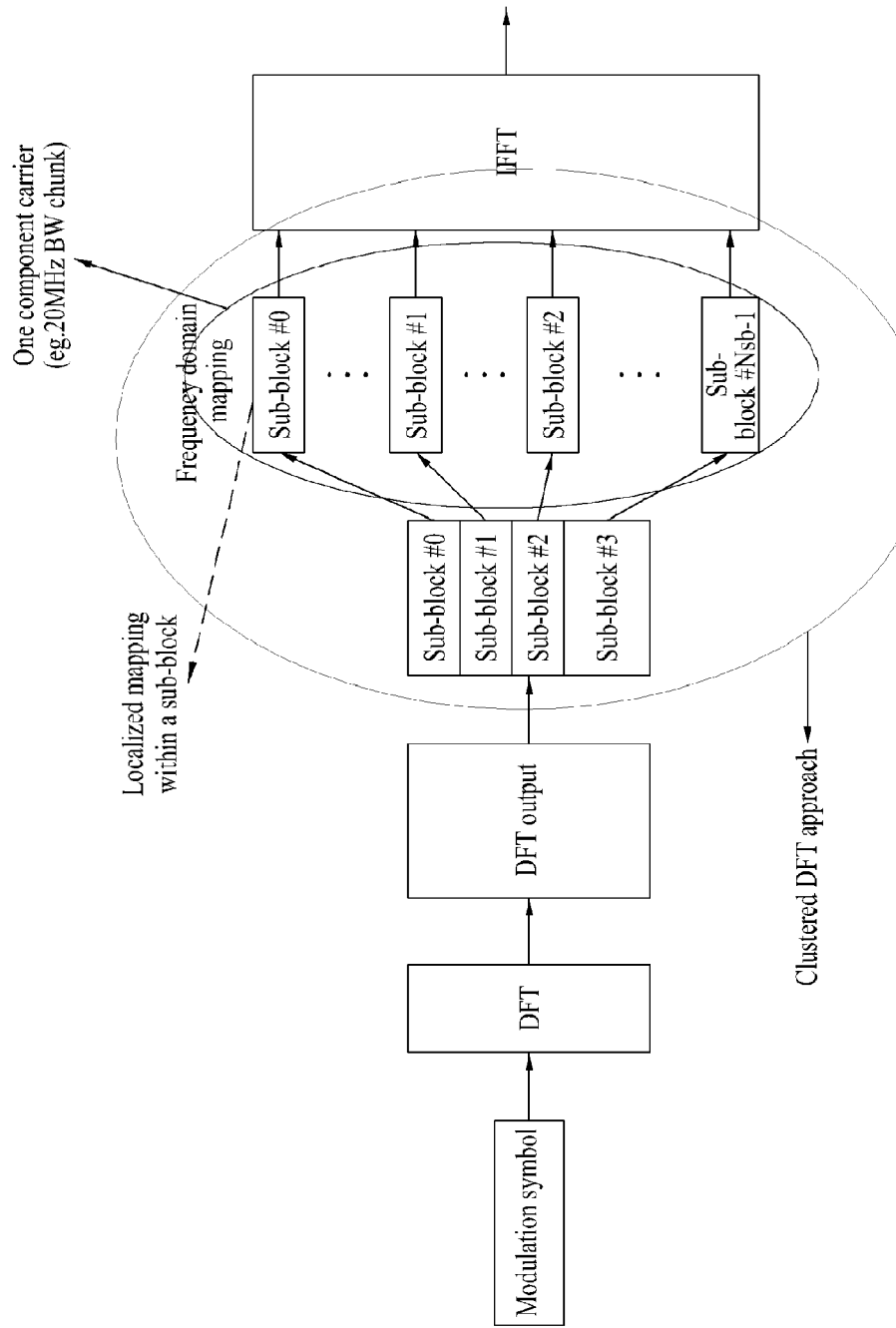
FIG. 6 is a diagram showing a signal processing procedure in which DFT process output samples are mapped to a single carrier in a clustered SC-FDMA scheme according to an embodiment of the present invention.
Figure 7:
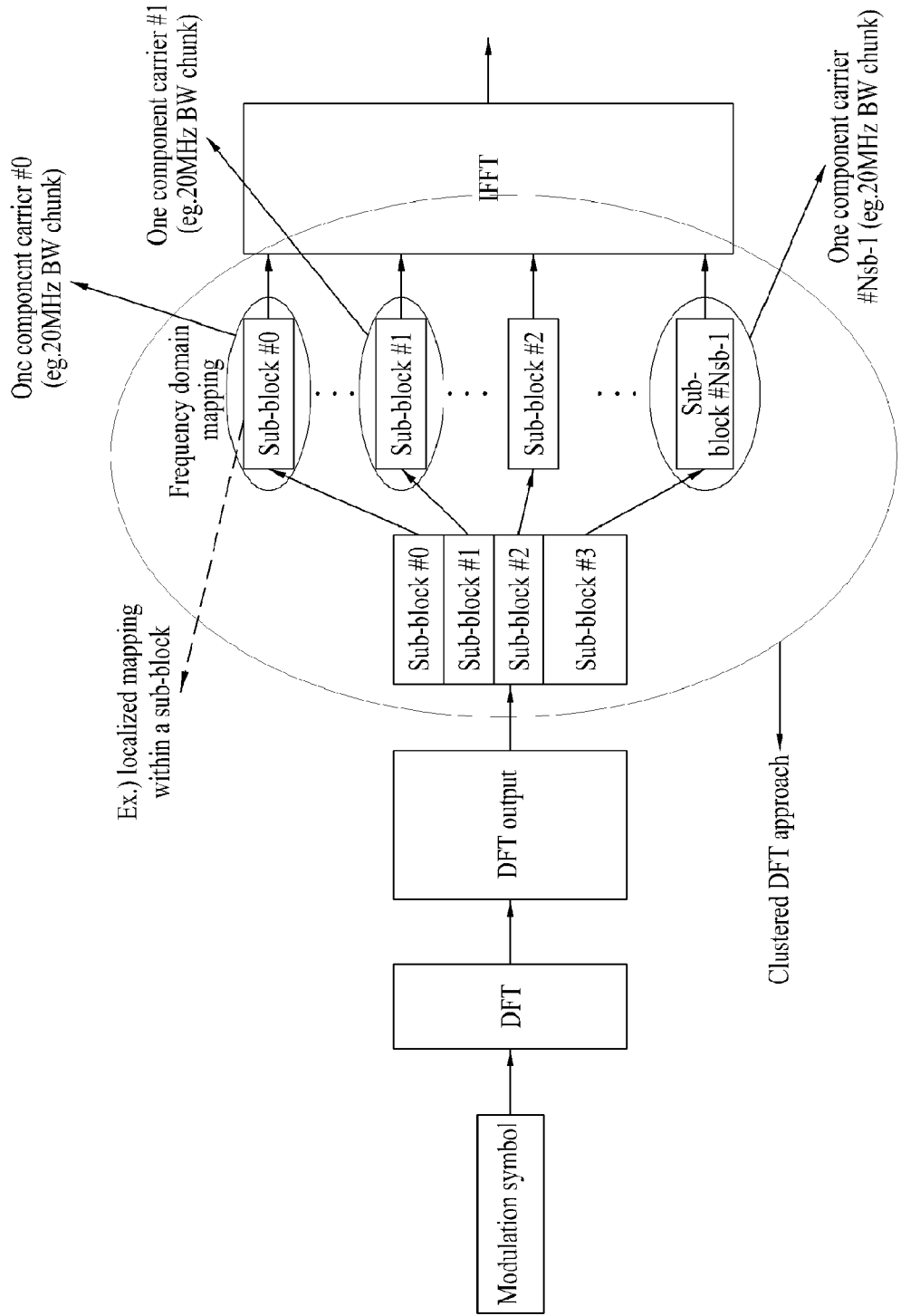
FIGS. 7 and 8 are diagrams showing a signal processing procedure in which DFT process output samples are mapped to multiple carriers in a clustered SC-FDMA scheme according to an embodiment of the present invention.
Figure 8:
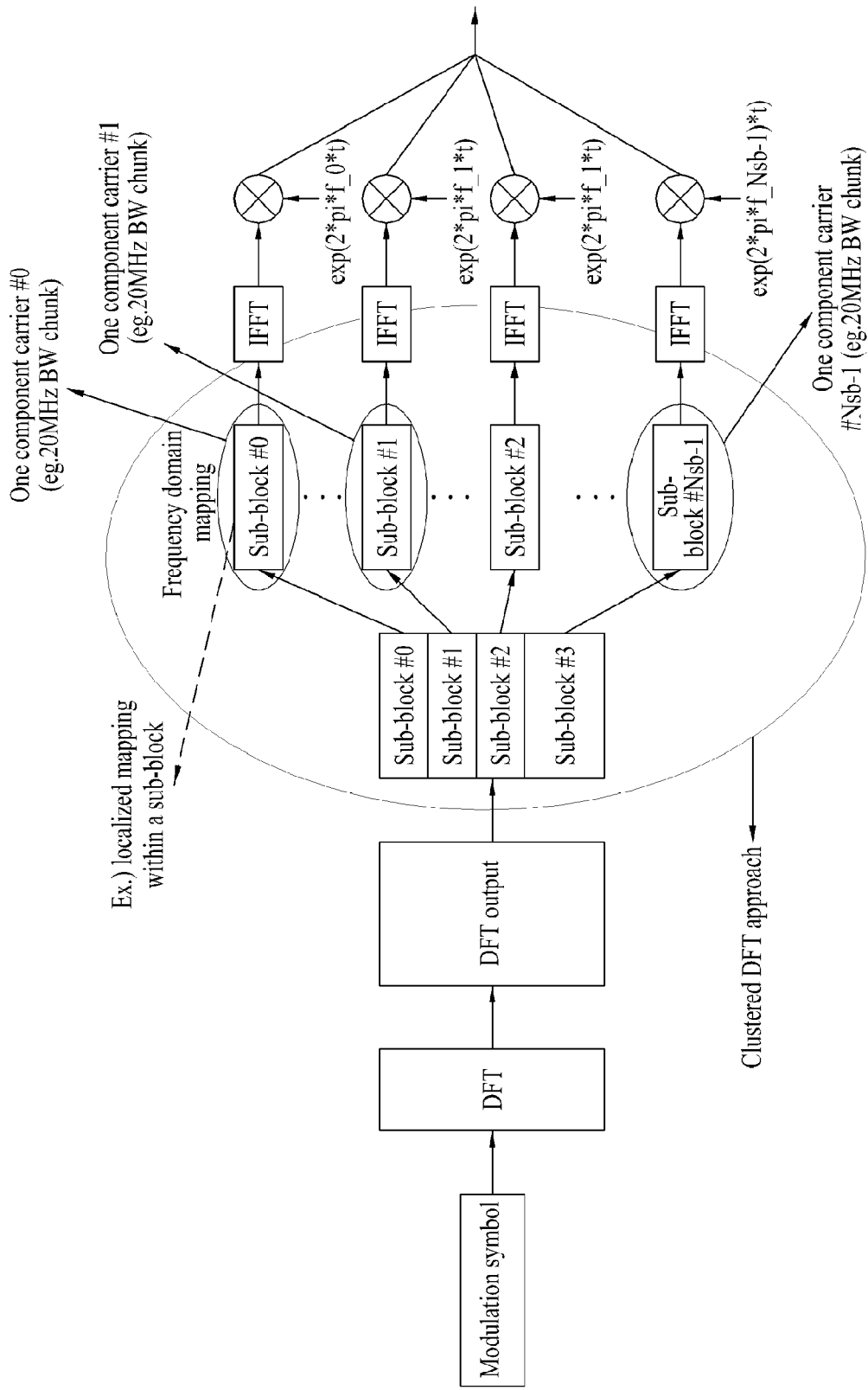

FIG. 6 is a diagram showing a signal processing procedure in which DFT process output samples are mapped to a single carrier in a clustered SC-FDMA scheme. FIGS. 7 and 8 are diagrams showing a signal processing procedure in which DFT process output samples are mapped to multiple carriers in a clustered SC-FDMA scheme.

FIG. 6 shows an example of applying a clustered SC-FDMA scheme in intra-carrier and FIGS. 7 and 8 show examples of applying a clustered SC-FDMA scheme in inter-carrier. FIG. 7 shows the case where a signal is generated by a single IFFT block if a subcarrier spacing between contiguous component carriers is aligned in a state in which component carriers are contiguously allocated in a frequency domain and FIG. 8 shows the case where a signal is generated by a plurality of IFFT blocks in a state in which component carriers are non-contiguously allocated in a frequency domain.

In the segmented SC-FDMA scheme, IFFTs corresponding in number to a certain number of DFTs are applied such that the DFTs and the IFFTs are in one-to-one correspondence so as to extend DFT spreading of the conventional SC-FDMA scheme and the frequency subcarrier mapping configuration of the IFFTs. Therefore, the segmented SC-FDMA scheme also referred to as an NxSC-FDMA or NxDFT-s-OFDMA scheme. In the present specification, this is referred to as the generic term "segmented SC-FDMA".

Figure 9:
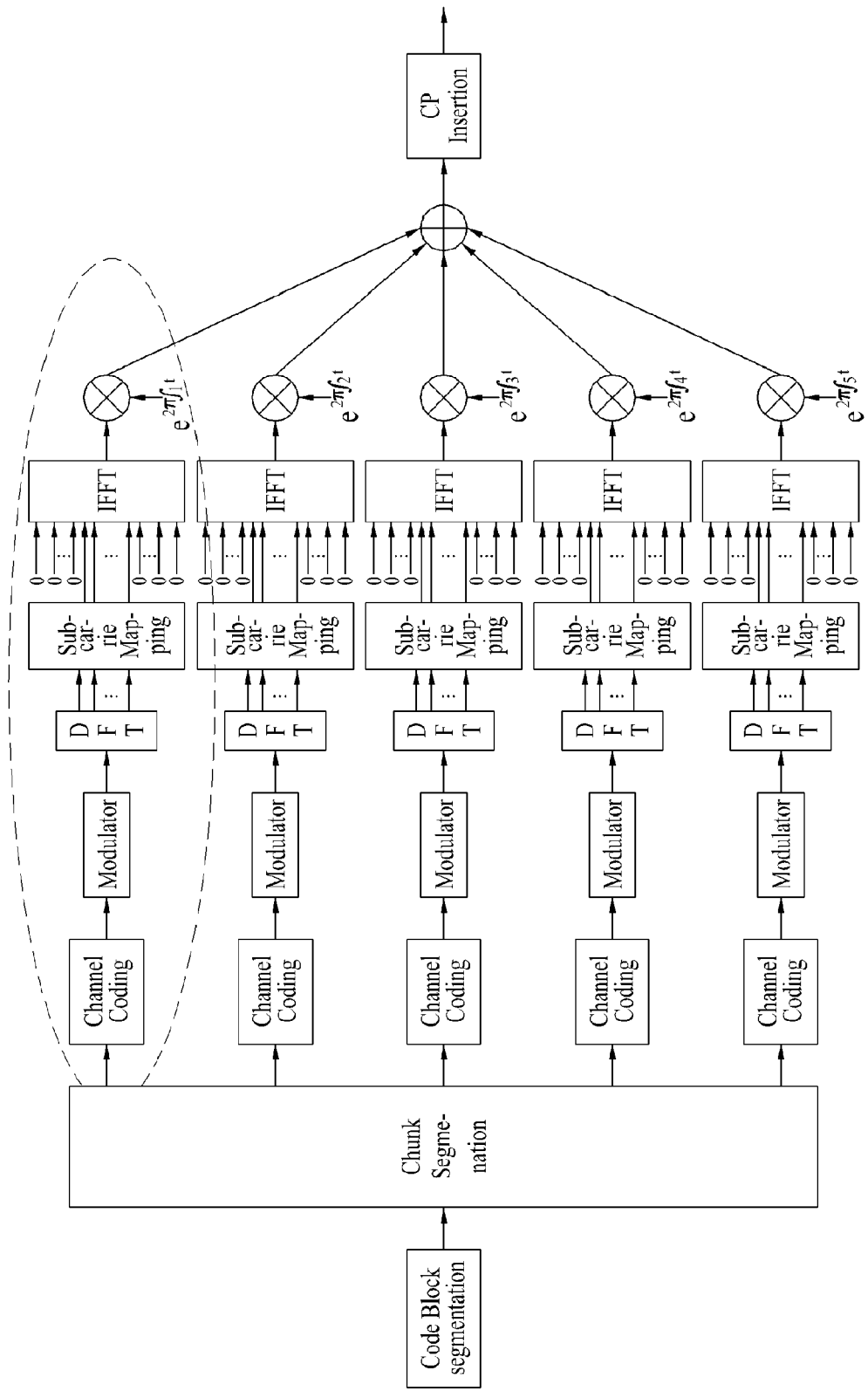
FIG. 9 is a diagram showing a signal processing procedure in a segmented SC-FDMA scheme according to an embodiment of the present invention.

FIG. 9 is a diagram showing a signal processing procedure in a segmented SC-FDMA scheme according to an embodiment of the present invention. As shown in FIG. 9, the segmented SC-FDMA scheme is characterized in that modulation symbols of an entire time domain are grouped into N (N being an integer greater than 1) groups and a DFT process is performed on a per group basis, in order to relax a single carrier property.

Figure 10:
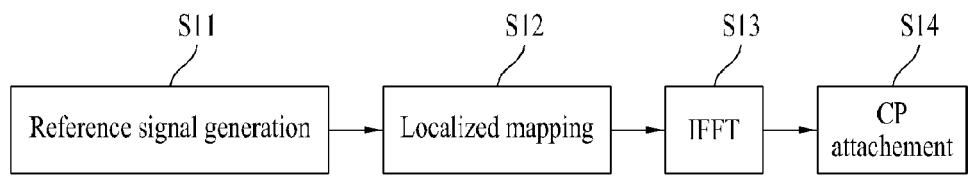
FIG. 10 is a diagram illustrating a signal processing procedure for transmitting a Reference Signal (RS) in uplink.

FIG. 10 is a diagram illustrating a signal processing procedure for transmitting a Reference Signal (RS) in uplink. As shown in FIG. 10, data is transmitted by generating a signal in a time domain, performing frequency mapping using a DFT precoder and performing IFFT. In contrast, an RS does not pass through a DFT precoder. More specifically, an RS is directly generated in a frequency domain (S11), subjected to a localized-mapping process (S12), subjected to IFFT (S13), subjected to a cyclic prefix (CP) attachment process (S14), and transmitted.

Figure 11:
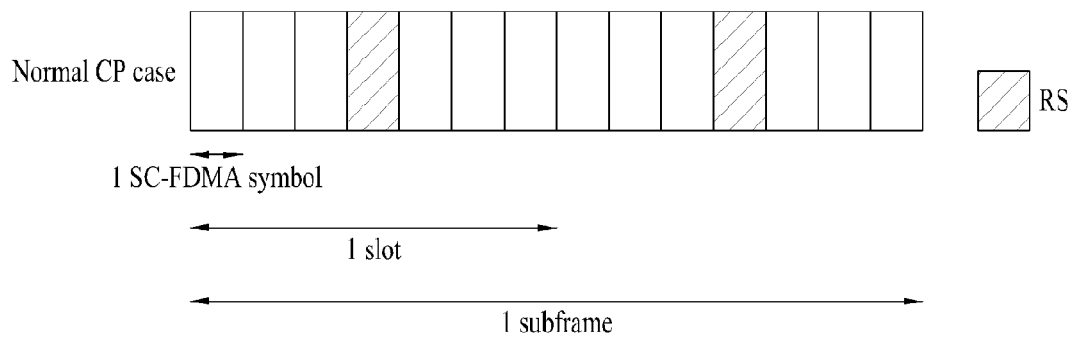
FIG. 11 is a diagram showing the structure of a subframe for transmitting an RS in a normal CP case.
Figure 12:
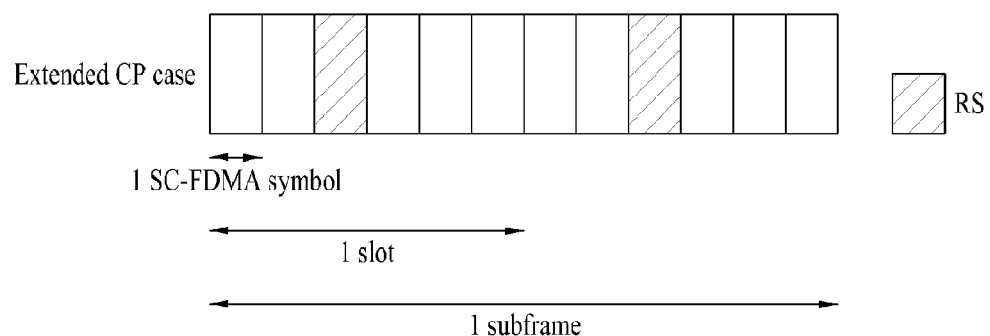
FIG. 12 is a diagram showing the structure of a subframe for transmitting an RS in an extended CP case.

FIG. 11 is a diagram showing the structure of a subframe for transmitting an RS in a normal CP case, and FIG. 12 is a diagram showing the structure of a subframe for transmitting an RS in an extended CP case. In FIG. 11, the RS is transmitted via fourth and eleventh OFDM symbols. In FIG. 12, the RS is transmitted via third and ninth symbols.

Figure 13:
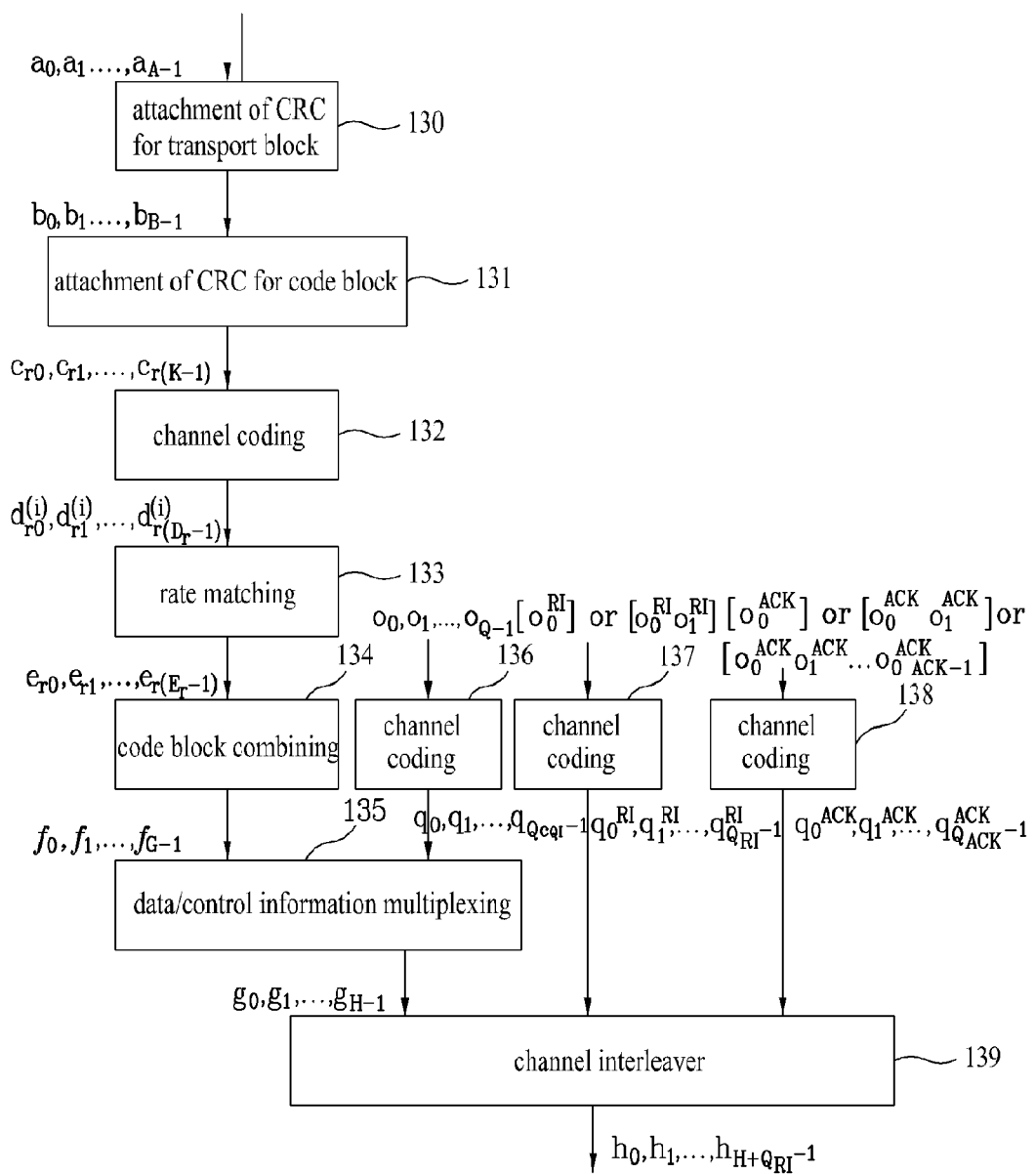
FIG. 13 is a block diagram illustrating a procedure of processing a transport channel for an uplink shared channel.

A processing structure of an uplink shared channel as a transport channel will now be described. FIG. 13 is a block diagram illustrating a procedure of processing a transport channel for an uplink shared channel. As shown in FIG. 13, cyclic redundancy check (CRC) for a transport block (TB) to be transmitted in uplink (130) is attached to data multiplexed with control information and the data multiplexed with control information is divided into several code blocks (CBs) according to TB size, and CRC for CB is attached to the several CBs (131). This result value is subjected to channel coding (132). Channel coded data is subjected to rate matching (133), CBs are combined (S134) and the combined CBs are multiplexed with channel quality information (CQI)/precoding matrix index (PMI) (135).

The CQI/PMI is subjected to channel coding, separately from the data (136). The channel coded CQI/PMI is multiplexed with data (135).

In addition, rank indication (RI) is subjected to channel coding, separately from data (137).

Acknowledgement (ACK)/negative acknowledgement (NACK) is subjected to channel coding, separately from CQI/PMI and RI (138) and channel coded RI and ACK/NACK is subjected to channel interleaving, separately from the multiplexed data and CQI/PMI so as to generate an output signal (139).

In an LTE uplink system, a physical resource element (RE) for data and control channel will be described.

Figure 14:
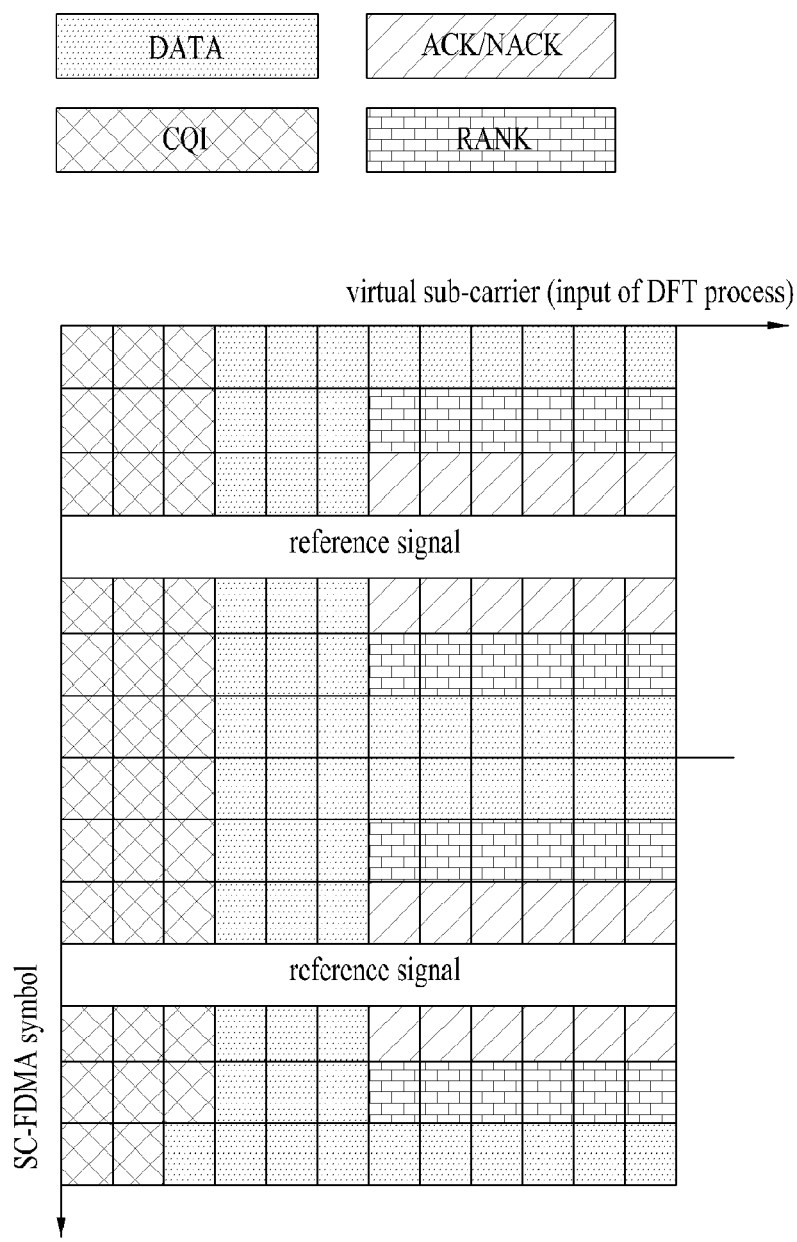
FIG. 14 is a diagram illustrating a method of mapping physical resources for transmitting uplink data and a control channel.

FIG. 14 is a diagram illustrating a method of mapping physical resources for transmitting uplink data and a control channel.

As shown in FIG. 14, CQI/PMI and data are mapped to REs using a time-first method. Encoded ACK/NACK is inserted into a punctured part around a demodulation reference signal (DM RS) symbol and RI is mapped to an RE located next to an RE where ACK/NACK is located. Resources for RI and ACK/NACK may occupy a maximum of four SC-FDMA symbols. If data and control information are simultaneously transmitted via an uplink shared channel, mapping is performed in order of RI, a concatenation of CQI/PMI and data and ACK/NACK. That is, RI is first mapped and a concatenation of CQI/PMI and data is then mapped to remaining REs excluding the RE, to which the RI is mapped, using a time-first method. ACK/NACK is mapped while puncturing the concatenation of CQI/PMI and data.

As described above, uplink control information (UCI) such as data and CQI/PMI is multiplexed so as to satisfy a single carrier property. Accordingly, it is possible to achieve uplink transmission with low cubic metric (CM).

In a system (e.g., LTE Rel-10) evolved from a conventional system, at least one of an SC-FDMA scheme and a clustered DFTs OFDMA scheme is applicable to each UE on each component carrier for uplink transmission and UL-MIMO transmission is also applicable.

Figure 15:
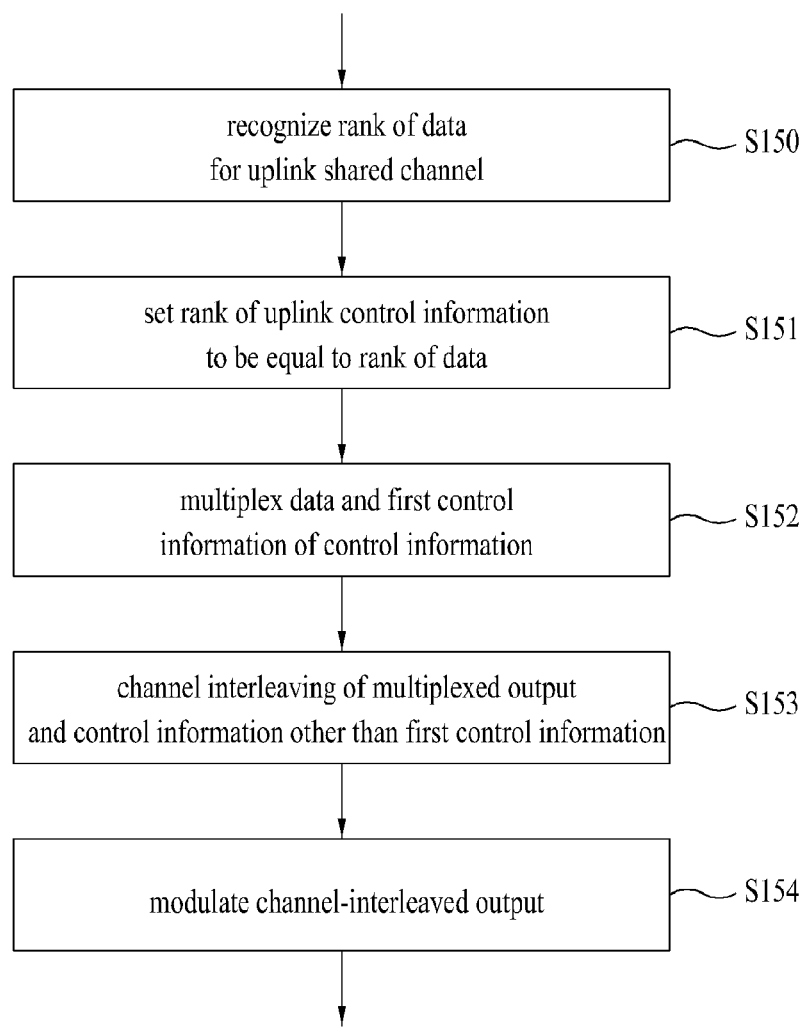
FIG. 15 is a flowchart illustrating a method of efficiently multiplexing data and a control channel on an uplink shared channel.

FIG. 15 is a flowchart illustrating a method of efficiently multiplexing data and a control channel on an uplink shared channel.

As shown in FIG. 15, a UE recognizes a rank of data of a physical uplink shared channel (PUSCH) (S150). Then, the UE sets a rank of an uplink control channel (the control channel means uplink control information (UCI) such as CQI, ACK/NACK and RI) to be equal to the rank of the data (S151). The UE multiplexes data and first control information (S152). Then, the data and the CQI are mapped using a time-first method, RI is mapped to a specific RE, ACK/NACK is mapped by puncturing an RE around a DM RS, thereby performing channel interleaving (S153).

Thereafter, data and a control channel may be modulated using QPSK, 16-QAM, 64-QAM, etc. according to an MCS table (S154). At this time, the modulation step may be shifted to another location (for example, the modulation block may be shifted to a previous step of the step of multiplexing the data and the control channel). In addition, channel interleaving may be performed in codeword units or layer units.

Figure 16:
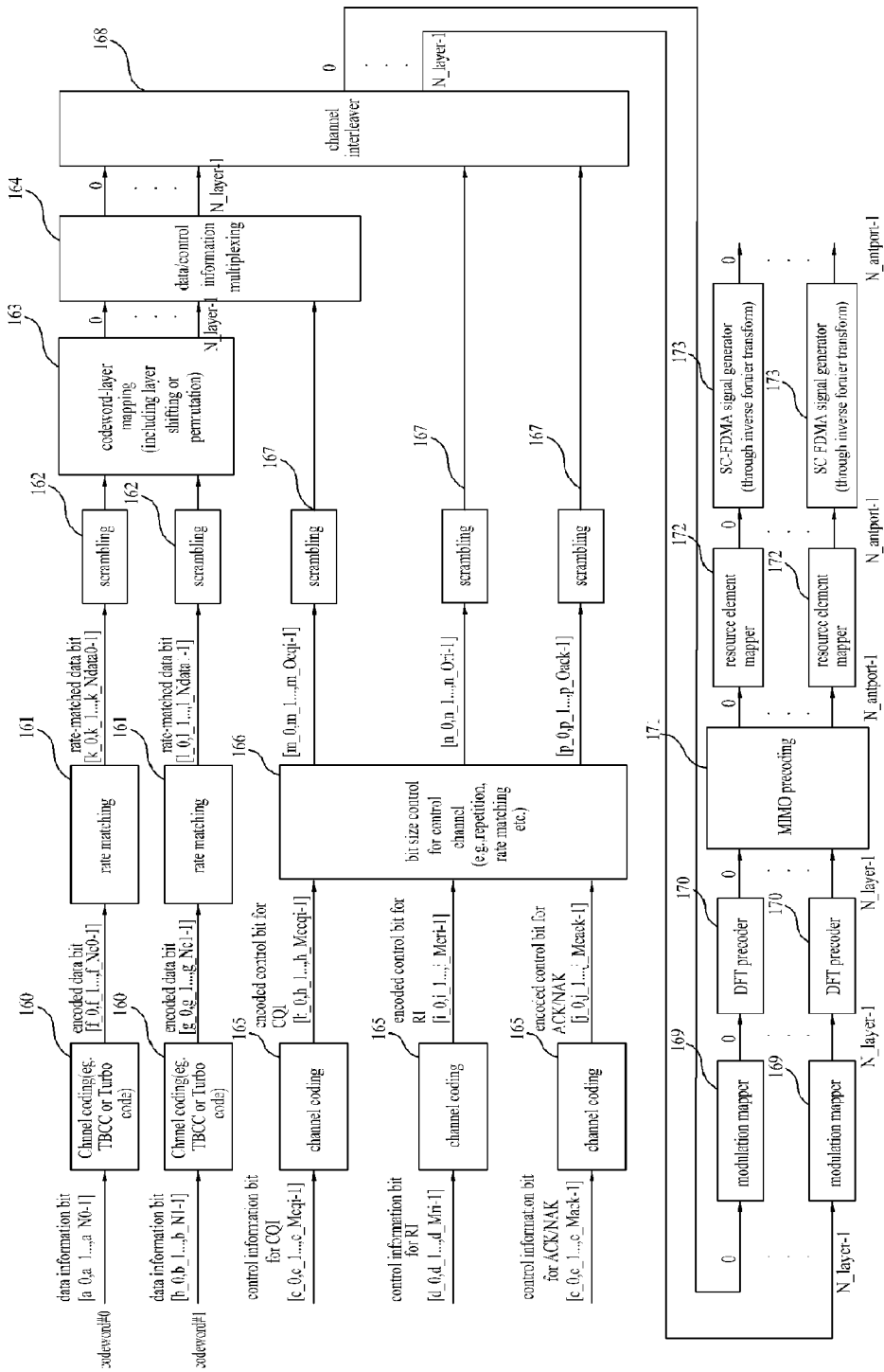
FIG. 16 is a block diagram illustrating a method of generating a transmitted signal of data and a control channel.

FIG. 16 is a block diagram illustrating a method of generating a transmitted signal of data and a control channel. The location of each block may be changed according to scheme.

Two codewords are assumed. Channel coding is performed with respect to each codeword (160) and rate matching is performed according to a given MCS level and resource size (161). Then, encoded bits may be scrambled using a cell-specific, UE-specific or codeword-specific scheme (162).

Then, codeword-to-layer mapping is performed (163). In this process, layer shift or permutation may be included.

Figure 17:
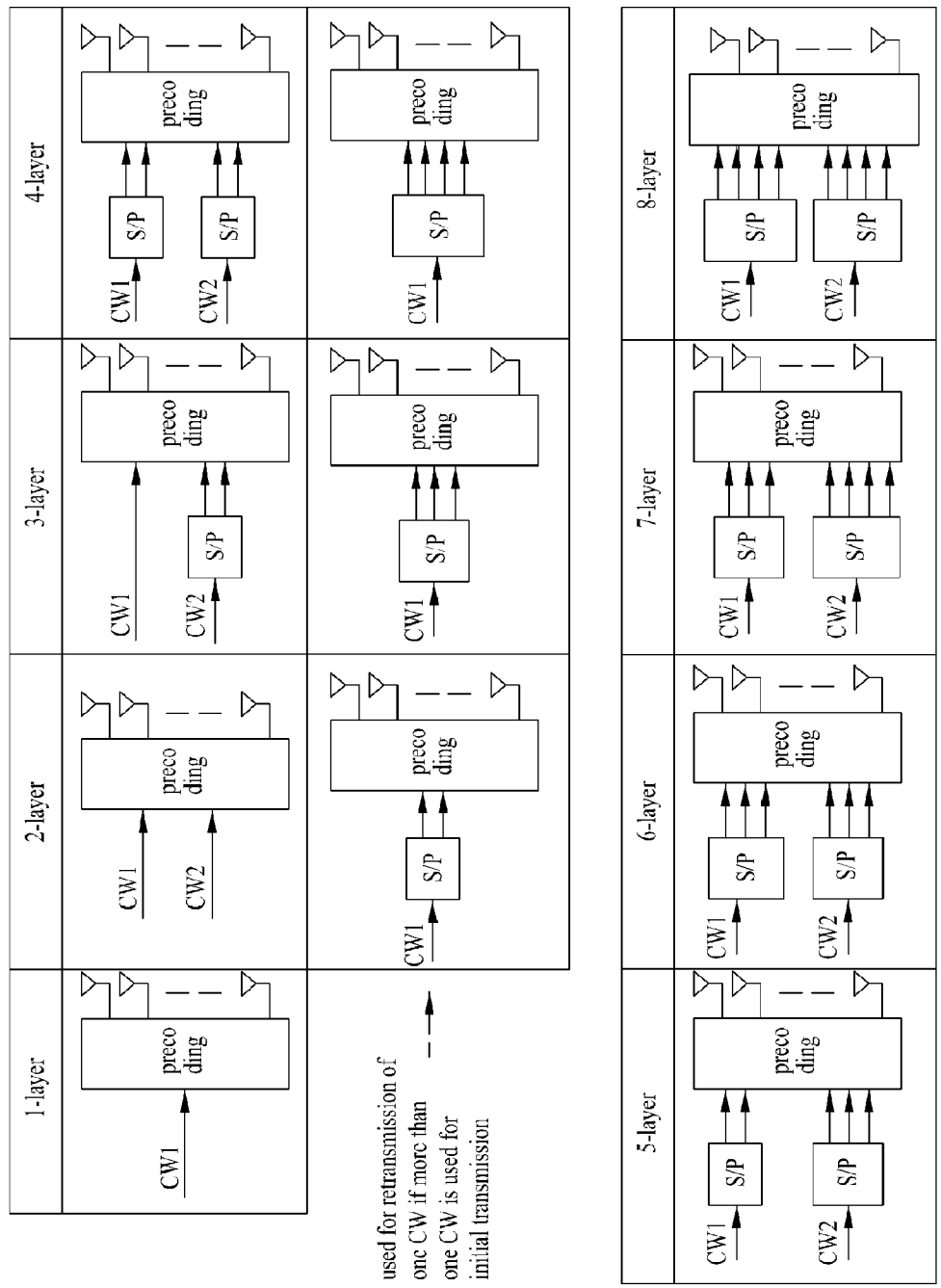
FIG. 17 is a diagram illustrating a codeword-to-layer mapping method.

FIG. 17 is a diagram illustrating a codeword-to-layer mapping method. Codeword-to-layer mapping may be performed using the rule shown in FIG. 17. A precoding location of FIG. 17 may be different from a precoding location of FIG. 13.

Control information such as CQI, RI and ACK/NACK is subjected to channel coding according to a given specification (165). At this time, CQI, RI and ACK/NACK may be coded using the same channel code with respect to all codewords or may be coded using different channel codes according to codewords.

Then, the number of encoded bits may be changed by a bit size controller (166). The bit size controller may be unified with a channel coding block 165. The signal output from the bit size controller is scrambled (167). At this time, scrambling may be performed in a cell-specific, layer-specific, codeword-specific or UE-specific manner.

The bit size controller may operate as follows.

(1) The controller recognizes a rank n_rank_pusch of data for a PUSCH.

(2) A rank n_rank_control of a control channel is set to be equal to the rank of the data (that is, n_rank_control=n_rank_pusch) and the number (n_bit_ctrl) of bits for the control channel is multiplied by the rank of the control channel to be extended.

A method of performing the above operation is performed by simply duplicating and repeating a control channel. At this time, this control channel may be an information level before channel coding or a coded bit level after channel coding. That is, for example, in case of control channel [a0, a1, a2, a3] of n_bit_ctrl=4 and n_rank_pusch=2, an extended bit number n_ext_ctrl may become 8 bits as [a0, a1, a2, a3, a0, a1, a2, a3].

If the bit size controller and a channel coder are unified, the coded bits may be generated by applying channel coding and rate matching defined in the existing system (e.g., LTE Rel-8).

In addition to the bit size controller, bit level interleaving may be performed for randomization of each layer. Alternatively, interleaving may be performed at a modulation symbol level.

The CQI/PMI channel and data for two codewords may be multiplexed by a data/control multiplexer (164). Then, while ACK/NACK information is mapped to an RE around an uplink DM RS in both slots within a subframe and a channel, a channel interleaver maps CQI/PMI according to a time-first mapping method (168).

Modulation is performed with respect to each layer (169), DFT precoding (170), MIMO precoding (171) and RE mapping (172), etc. are sequentially performed. Then, an SC-FDMA signal is generated and transmitted via an antenna port (173).

The functional blocks are not limited to the locations shown in FIG. 16 and the locations thereof may be changed as necessary. For example, the scrambling blocks 162 and 167 may be located next to a channel interleaving block. The codeword-to-layer mapping block 163 may be located next to a channel interleaving block 168 or a modulation mapper block 169.

The present invention proposes a channel coding method of UCI if UCI such as CQI, ACK/NACK and RI is transmitted on a PUSCH and a resource allocation and transmission method. The present invention is described with respect to transmission in a SU-MIMO environment and is applicable to a single antenna transmission scheme which is a special case of an SU-MIMO scheme.

In an SU-MIMO scheme, UCI and data are transmitted on a PUSCH using the following method. The location of the UCI on the PUSCH will now be described.

CQI is contiguous to data and is mapped to REs other than REs, to which RI is mapped, using a time-first mapping method using the same modulation order and constellation as the data. In case of SU-MIMO, the CQI is spread and transmitted on one codeword and a codeword on which the CQI is transmitted is a codeword having a high MCS level between two codewords. If the MCS levels of the codewords are identical, the CQI is transmitted on the codeword 0. In addition, ACK/NACK is arranged while puncturing concatenation of CQI and data already mapped to symbols located at both sides of a reference signal and is mapped from the bottommost subcarrier of second, fourth, ninth and eleventh symbols upward because reference signals are located at third and tenth symbols. At this time, ACK/NACK symbols are mapped in order of second, eleventh, ninth and fourth symbols. RI is mapped to symbols located next to ACK/NACK and is first mapped among all information (data, CQI, ACK/NACK and RI) transmitted on the PUSCH. More specifically, the RI is mapped from the bottommost subcarrier of first, fifth, eighth and twelfth symbols upward. At this time, RI symbols are mapped in order of first, twelfth, eighth and fifth symbols. In particular, ACK/NACK and RI may be mapped using only four edges of constellation using a QPSK scheme if the size of information bits is 1 bit or 2 bits and may be mapped using all constellations of the same modulation order as data if the size of information bits is 3 bits or more. In addition, the ACK/NACK and the RI transmit the same information using the same resources of the same location in all layers.

Channel coding of the ACK/NACK and the RI transmitted on the PUSCH will be described. If an information data size of the ACK/NACK and the RI is 1 bit, that is, if an input sequence is $[O_0^{UCI}]$, channel coding is performed according to a modulation order $Q_m$ as shown in Table 1 below. In addition, if an information data size of the ACK/NACK and the RI is 2 bits, that is, if an input sequence is $[O_0^{UCI} O_1^{UCI}]$, channel coding is performed according to a modulation order $Q_m$ as shown in Table 2 below. In particular, in Table 3, $O_0^{UCI}$ corresponds to ACK/NACK or RI data for codeword 0, $O_1^{UCI}$ corresponds to ACK/NACK or RI data for codeword 1, and $O_2^{UCI}$ is $(O_0^{UCI} + O_1^{UCI})$. In particular, in Tables 1 and 2, x denotes a value of 1 and y denotes repetition of a previous value.

TABLE 1

| $Q_m$ | Encoded HARQ-ACK/RI |
|---|---|
| 2 | $[o_0^{UCI} y]$ |
| 4 | $[o_0^{UCI} y x x]$ |
| 6 | $[o_0^{UCI} y x x x x]$ |

TABLE 2

| $Q_m$ | Encoded HARQ-ACK/RI |
|---|---|
| 2 | $[o_0^{UCI} o_1^{UCI} o_2^{UCI} o_0^{UCI} o_1^{UCI} o_2^{UCI}]$ |
| 4 | $[o_0^{UCI} o_1^{UCI} x x o_2^{UCI} o_0^{UCI} x x o_1^{UCI} o_2^{UCI} x x]$ |
| 6 | $[o_0^{UCI} o_1^{UCI} x x x x o_2^{UCI} o_0^{UCI} x x x x o_1^{UCI} o_2^{UCI} x x x x]$ |

Hereinafter, a scrambling process associated with bundling and a scrambling process for physical channel mapping will be described.

First, the scrambling process associated with bundling will be described.

The scrambling process performed if bundling of ACK/NACK is performed in a TDD mode will be described.

Table 3 shows a scrambling process for bundling ACK/NACK.

TABLE 3

```
Set i,k to 0
while i < Q_ACK
  if q̃_i^ACK = y
    q_i^ACK = (q̃_{i-1}^ACK + w_{⌊k/m⌋}^ACK)mod 2    // place-holder repetition bit
    k = (k + 1)mod 4m
  else
    if q̃_i^ACK = x
      q_i^ACK = q̃_i^ACK                            // a place-holder bit
    else
      q_i^ACK = (q̃_i^ACK + w_{⌊k/m⌋}^ACK)mod 2     // coded bit
      k = (k + 1)mod 4m
  end if
  i = i + 1
end while
```

Referring to Table 3, if bundling is performed in the TDD mode, there is a need for notifying a BS of the number of bundled information blocks or component carriers. Accordingly, if bundling is performed, ACK/NACK information may be subjected to a scrambling process to notify the BS of the number of bundled information blocks or component carriers.

In case of TDD HARQ-ACK bundling, a bit sequence $\tilde{q}_0^{ACK}, \tilde{q}_1^{ACK}, \tilde{q}_2^{ACK}, \ldots, \tilde{q}_{Q_{ACK}-1}^{ACK}$ may be acquired by concatenation of a plurality of encoded HARQ-ACK blocks.

A scrambling sequence $[w_0^{ACK} w_1^{ACK} w_2^{ACK} w_3^{ACK}]$ is selected by Table 4 through $i = (N_{bundled} - 1)\bmod 4$ and Table 4 shows selection of a scrambling sequence for TDD-HARQ bundling. Here, $N_{bundled}$ is the number of bundled component carriers. The bit sequence is set to m=1 if HARQ-ACK is composed of 1 bit and is set to m=3 if HARQ-ACK is composed of 2 bits.

TABLE 4

| i | $[w_0^{ACK} w_1^{ACK} w_2^{ACK} w_3^{ACK}]$ |
|---|---|
| 0 | [1 1 1 1] |
| 1 | [1 0 1 0] |
| 2 | [1 1 0 0] |
| 3 | [1 0 0 1] |

Through the above process, the scrambling process for bundling is performed.

Referring to Table 3, a process of obtaining a bit sequence $q_0^{ACK}, q_1^{ACK}, q_2^{ACK}, \ldots, q_{Q_{ACK}-1}^{ACK}$ which is a scrambled result using a scrambling sequence $[w_0^{ACK} w_1^{ACK} w_2^{ACK} w_3^{ACK}]$ selected from the selected i and an encoded bit sequence is shown.

If the above-described scrambling process for bundling is applied, the results of the following Tables 5 to 9 are obtained.

One block, that is, one component carrier, may include a maximum of two pieces of ACK/NACK data. In addition, such blocks or component carriers may be bundled and transmitted together.

The results of Tables 5 to 9 are obtained by applying the scrambling process used for ACK/NACK bundling and applying 1-bit ACK/NACK information. In case of bundling, ACK/NACK supports only information of up to 2 bits and scrambling of ACK/NACK is applied to only an information bit and a repetition bit y. Thus, encoded ACK/NACK shows constellation of QPSK regardless of modulation order. Accordingly, Tables 5 to 9 show only QPSK.

TABLE 5

| ACK/NACK information | Encoded data | Scrambled data |
|---|---|---|
| ACK/ACK | 1111 | 0000 |
| ACK/NACK | 1100 | 0011 |
| NACK/ACK | 0011 | 1100 |
| NACK/NACK | 0000 | 1111 |

Table 5 shows the case in which bundling is not performed.

TABLE 6

| ACK/NACK information | Encoded data | Scrambled data |
|---|---|---|
| (A, A)/(A, A) | 1111 | 0101 |
| (A, A)/NACK | 1100 | 0110 |
| NACK/(A, A) | 0011 | 1001 |
| NACK/NACK | 0000 | 1010 |

Table 6 shows the case in which two blocks are bundled.

TABLE 7

| ACK/NACK information | Encoded data | Scrambled data |
|---|---|---|
| (A, A, A)/(A, A, A) | 1111 | 0011 |
| (A, A)/NACK | 1100 | 0000 |
| NACK/(A, A, A) | 0011 | 1111 |
| NACK/NACK | 0000 | 1100 |

Table 7 shows the case in which three blocks are bundled.

TABLE 8

| ACK/NACK information | Encoded data | Scrambled data |
|---|---|---|
| (A, A, A, A)/(A, A, A, A) | 1111 | 0110 |
| (A, A, A, A)/NACK | 1100 | 0101 |
| NACK/(A, A, A, A) | 0011 | 1010 |
| NACK/NACK | 0000 | 1001 |

Table 8 shows the case in which four blocks are bundled.

TABLE 9

| ACK/NACK information | Encoded data | Scrambled data |
|---|---|---|
| (A, A, A, A, A)/(A, A, A, A, A) | 1111 | 0000 |
| (A, A, A, A, A)/NACK | 1100 | 0011 |
| NACK/(A, A, A, A, A) | 0011 | 1100 |
| NACK/NACK | 0000 | 1111 |

Table 9 shows the case in which five blocks are bundled.

A simple example of the scrambled result of encoded data will be described.

In case of Table 5, bundling is not performed, $N_{bundled}=1$ and i is 0. Thus, a scrambling sequence $[w_0^{ACK} w_1^{ACK} w_2^{ACK} w_3^{ACK}]$ becomes 1111. Accordingly, if this scrambling sequence is applied to the scrambling process for bundling shown in Table 3, encoded data $\tilde{q}_0^{ACK}$, $\tilde{q}_1^{ACK}$, $\tilde{q}_2^{ACK}, \ldots, \tilde{q}_{Q_{ACK}-1}^{ACK}$ is 1111 in case of ACK/NACK and thus scrambled data becomes 0000.

In case of Table 6, two blocks are bundled, $N_{bundled}=2$ and i is 1. Thus, a scrambling sequence $[w_0^{ACK} w_1^{ACK} w_2^{ACK} w_3^{ACK}]$ becomes 1010. In this case, if this scrambling sequence is applied to the scrambling process for bundling shown in Table 3, encoded data $\tilde{q}_0^{ACK}$, $\tilde{q}_1^{ACK}$, $\tilde{q}_2^{ACK}, \ldots, \tilde{q}_{Q_{ACK}-1}^{ACK}$ is 1111 in case of (ACK, ACK)/(ACK, ACK) and thus scrambled data becomes 0101. In case of (ACK, ACK)/NACK, encoded data $\tilde{q}_0^{ACK}$, $\tilde{q}_1^{ACK}$, $\tilde{q}_2^{ACK}, \ldots, \tilde{q}_{Q_{ACK}-1}^{ACK}$ is 1100 and thus scrambled data 0110. The above method is also applicable to Tables 7 to 9.

As can be seen from the scrambled data in Tables 5 to 9, data scrambled using a scrambling sequence which varies according to the number of bundled HARQ-ACK blocks has the same codeword set if the number of bundled HARQ-ACK blocks is 1, 3 and 5 and has the same codeword set if the number of bundled HARQ-ACK blocks is 2 and 4.

If the same codeword set is used although the number of blocks is different, occurrence frequencies of ACK and NACK are significantly different and thus the number of blocks may be checked by occurrence frequency of codeword. However, if the number of samples which are used to determine the occurrence frequency is small, that is, if the number of times of ACK/NACK transmission is small, accuracy may deteriorate and thus performance may deteriorate. In addition, if a difference between the occurrence frequencies of ACK and NACK are not instantaneously large, accuracy may deteriorate.

Since scrambling is performed before rate matching and the same bit stream is repeated even upon rate matching, even when an ACK/NACK bit stream lengthens through rate matching, there may be no improvement in checking the number of bundled HARQ-ACK blocks and ACK/NACK.

Accordingly, there is a need for a method of accurately sending the number of bundled blocks without using a scrambling process for bundling.

Hereinafter, a scrambling process for physical channel mapping will be described.

Table 10 shows a scrambling process for physical channel mapping.

TABLE 10

```
Set i = 0
while i < M_bit
    if b(i) = x                    // ACK/NACK Indication placeholder bits
        b̃(i) = 1
    else
        if b(i) = y                // ACK/NACK repetition placeholder bits
            b̃(i) = b̃(i − 1)
        else                       // ACK/NACK coded bits
            b̃(i) = (b(i) + c(i))mod 2
        end if
    end if
    i = i + 1
end while
```

Referring to Table 10, if it is assumed that an input bit block input to the scrambling process is $b(0), \ldots, b(M_{bit}-1)$, $M_{bit}$ is the number of bits transmitted on a PUSCH in one subframe. Input bits are scrambled to a UE-dedicated scrambling sequence before a modulation process and are scrambled to a scrambling bit block $\tilde{b}(0), \ldots, \tilde{b}(M_{bit}-1)$ according to the pseudo code. Here, x is a value of 1 and y is repetition of a previous value.

In the scrambling process shown in Table 10, if some bits b(i) of an encoded bit block $b(0), \ldots, b(M_{bit}-1)$ before the scrambling process are information bits which are not x or y, a scrambling sequence c(i) is applied.

The scrambling sequence c(i) is a pseudo-random sequence and may be defined by a length-31 gold sequence. The output sequence c(i) may be defined by the following equation.

$$c(i)=(x_1(i+N_C)+x_2(i+N_C)) \bmod 2$$

$$x_1(i+31)=(x_1(i+3)+x_1(i)) \bmod 2$$

$$x_2(i+31)=(x_2(i+3)+x_2(i+2)+x_2(i+1)+x_2(i)) \bmod 2 \quad \text{Equation 1}$$

where, $N_C=1600$ and a first m-sequence is initialized to $x_1(0)=1$, $x_1(i)=0$, $i=1, 2, \ldots, 30$. A second m-sequence is $c_{init}=\Sigma_{i=0}^{30} x_2(i) \cdot 2^i$ which changes according to sequence application.

Through such a process, ACK/NACK information may be subjected to a scrambling process for physical channel mapping.

As described above, if it is assumed that ACK/NACK information is bundled in a TDD mode, ACK/NACK information is subjected to a scrambling process for bundling and a scrambling process for physical channel mapping. That is, two scrambling sequences are applied. In general, if an additional process using a scrambling sequence is applied, a probability of errors occurring in a detection or decoding process may be increased. Due to increase in the probability of errors occurring, performance may deteriorate.

The present invention proposes a method of replacing a scrambling process used when ACK/NACK is bundled in TDD-LTE using a scrambling sequence used in a scrambling process for physical channel mapping.

That is, a method of checking the number of HARQ-ACK blocks bundled using a scrambling sequence used in a scrambling process for physical channel mapping is disclosed.

The present invention proposes a method of indicating the number of ACK/NACK blocks using only one scrambling sequence process not only when ACK/NACK is transmitted in one transport block having one layer but also when ACK/NACK is bundled in a plurality of transport blocks having one or a plurality of layers. Although, for convenience, HARQ- ACK is described in the present invention, the method proposed by the present invention is applicable to all control signals (e.g., RI or CQI) used for bundling. In addition, the present invention is applicable to the case in which all or some of UCI (ACK/NACK, RI and CQI) is repeated or spread and transmitted on REs corresponding in number to the number of layers when UCI and PUSCH data are transmitted on a PUSCH using a plurality of layers.

The present invention proposes a method of checking the number of bundled HARQ-ACK blocks using only one scrambling sequence if ACK/NACK is bundled in a TDD mode using a scrambling sequence used in a scrambling process for physical channel mapping, and applying scrambling of ACK/NACK.

The present invention proposes a method of indicating scrambling of ACK/NACK and the number of bundled HARQ-ACK blocks using only one scrambling sequence process not only when ACK/NACK is transmitted in one transport block having one layer but also when ACK/NACK is bundled in one or a plurality of transport blocks having one or a plurality of layers as described in LTE Rel-8.

Figure 18:
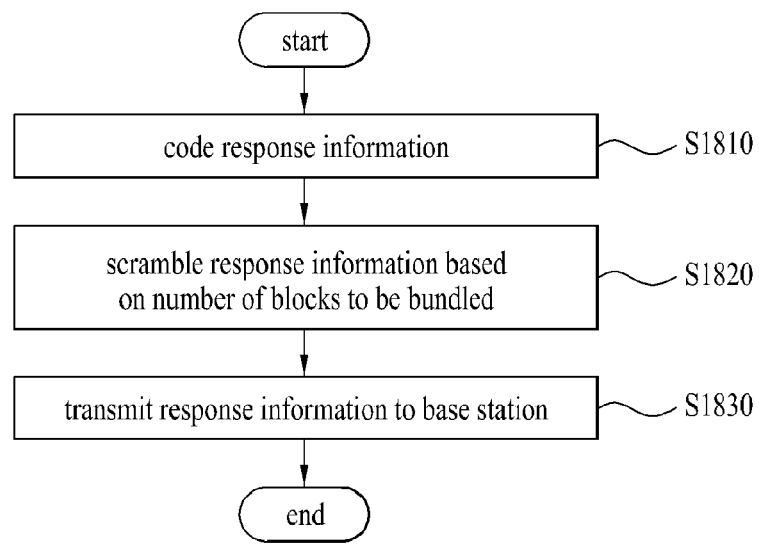
FIG. 18 is a flowchart illustrating a method for transmitting response information according to the present invention.

FIG. 18 is a flowchart illustrating a method for transmitting response information including ACK/NACK information according to the present invention.

A coding module codes response information including ACK/NACK information (S1810). A scrambling module scrambles the coded response information (S1820). The scrambling step is a scrambling process for physical channel mapping and a scrambling sequence used in the scrambling process may include information about the number of bundled blocks. A radio frequency (RF) module transmits the scrambled information to a BS (S1830).

Through such a flow, the number of bundled blocks or component carriers may be included in the response information through one scrambling process.

A method of adjusting a start point of a scrambling sequence $c(i)$ according to a first embodiment of the present invention will be described.

The above-described scrambling sequence $c(i)$ has a start point. In the present invention, the start point (an initial value of a scrambling sequence) of $c(i)$ may be differently set according to the number of bundled HARQ-ACK blocks. Accordingly, the number of HARQ-ACK blocks may be distinguished through the scrambling sequence $c(i)$, that is, through one scrambling sequence.

ACK/NACK is scrambled using the scrambling sequence $c(i)$ regardless of bundling. Accordingly, if scrambling is performed in a state in which the start point of $c(i)$ is differently set according to the number of bundled HARQ-ACK blocks, the number of bundled HARQ-ACK blocks may be estimated without an additional scrambling process.

A method of adjusting the start point according to the number of bundled HARQ-ACK blocks include the following various methods. The following methods use the existing scrambling sequence $c(i)$ without change if the number of bundled HARQ-ACK block is 1, for backward compatibility.

In a first method of a first embodiment, the start point may be shifted by subtracting 1 from the number of bundled HARQ-ACK blocks. The reason why 1 is subtracted is that backward compatibility is achieved if bundling is not performed. For example, if the number of bundled HARQ blocks is k, an applied scrambling sequence may be set to $c(i+k-1)$ or $c(i-(k-1))=c(i-k+1)$.

In a second method of the first embodiment, if the number of bundled HARQ-ACK blocks is k, the start point may be set to a multiple of k-1. That is, an arbitrary integer $\delta$ may be inserted into an initial value. For example, if the number of bundled HARQ blocks is k, an applied scrambling sequence may be set to $c(i+\delta(k-1))$ or $c(i-\delta(k-1))$.

A detailed application example of the second method, a specific value may be substituted for $\delta$.

For example, $\delta$ is a power of 2. That is, with respect to an arbitrary integer a, $\delta$ may be $2^a$. In addition, $\delta$ may be the length of HARQ-ACK information subjected to scrambling. At this time, the length of HARQ-ACK information may be the length of data before encoding or the length of encoded data.

In a third method of the first embodiment, the start point of the scrambling sequence may be set to a unique value according to the number of bundled HARQ-ACK blocks. That is, if the number of bundled HARQ-ACK blocks is k, the start point may be $p_k$. At this time, for compatibility with the conventional scrambling method, $p_1=0$ and, in case of k>1, $p_k$ may have a different integer other than 0. The $p_k$ value be a different value if a modulo operation is performed with a period of a scrambling sequence. With respect to contiguous k, the $p_k$ values may be partially or wholly contiguous values or may not be contiguous values.

Hereinafter, a method of modifying a scrambling sequence when transmission is performed via a plurality of antennas according to a second embodiment of the present invention will be described.

In a TDD mode, if HARQ-ACK information is transmitted not via one antenna but via a plurality of antennas (for example, HARQ-ACK information is multiplexed in a PUSCH), the above-described methods of adjusting the start point of $c(i)$ may be used without change.

However, since the same information is transmitted or information is divided and transmitted using a plurality of antennas, the following methods different from the above-described methods may be used.

In a first method of the second embodiment, the same scrambling sequence is applied to all antennas (or layers). The scrambling sequence applied to each antenna (or layer) may be modified as follows.

First, the same start point may be applied while the same scrambling sequence is applied to all layers. In this case, the start point may be applied using the method of adjusting the start point of the first embodiment without change. The case in which the number of bundled HARQ-ACK blocks is 1 is equal to the case in which bundling is not performed.

Selectively, different start points may be applied to some of the antennas (or layers). That is, the start point may not be changed with respect to some antennas (or layers) and may be changed with respect to the remaining antennas (or layers). In a simple example, if HARQ-ACK is transmitted using two antennas (or layers), the start point is not changed with respect to a first antenna (or layer) and is changed with respect to a second antenna (or layer) or the start point is changed with respect to the first antenna (or layer) and is not changed with respect to the second antenna (or layer). In addition, the start point applied to each antenna (or layer) may be changed according to antenna (or layer) or the same start point may be applied to some antennas (or layers).

In a second method of the second embodiment, some or respective antennas (layers) may use different scrambling sequences. For example, a first scrambling sequence $c_0(i)$ may be used for a first antenna and a second scrambling sequence $c_1(i)$ may be used for a second antenna.

Different scrambling sequences are used for respective antennas and the same start point is applied to all antennas (or layers). In this case, the method of the first embodiment of the present invention is applicable to an applicable initial value.

In addition, the case in which the number of bundled HARQ-ACK blocks is 1 is equal to the case in which bundling is not performed.

Different scrambling sequences are used for respective antennas and the start point is differently applied to some antennas (or layers). That is, the start point may not be changed with respect to some antennas (or layers) and may be changed with respect to the remaining antennas (or layers). At this time, the antennas (or layers) to which the start point is differently applied may be partially or wholly contiguous or may not be contiguous. For example, if HARQ-ACK is transmitted using two antennas (or layers), the start point is not changed with respect to a first antenna (or layer) and is changed with respect to a second antenna (or layer) or the start point is changed with respect to the first antenna (or layer) and is not changed with respect to the second antenna (or layer). In addition, the start point applied to each antenna (or layer) may be changed according to antenna (or layer) and the same start point may be applied to some antennas (or layers).

If the above method is used, it is possible to prevent beamforming which may be generated when the same signal is transmitted via all or some of antennas (or layers).

A third method of the second embodiment is a modification of the first method and the second method, in which some antennas use the same scrambling sequence and the remaining antennas use different scrambling sequences.

By applying the third method, the same start point may be added to all antennas (or layers) so as to apply new start points. Thus, different start points may be applied to antennas.

As another example of the third method, only start points of some scrambling sequences of all antennas (or layers) may be differently applied. That is, the start point may not be changed with respect to some antennas and may be changed with respect to the remaining antennas.

Figure 19:
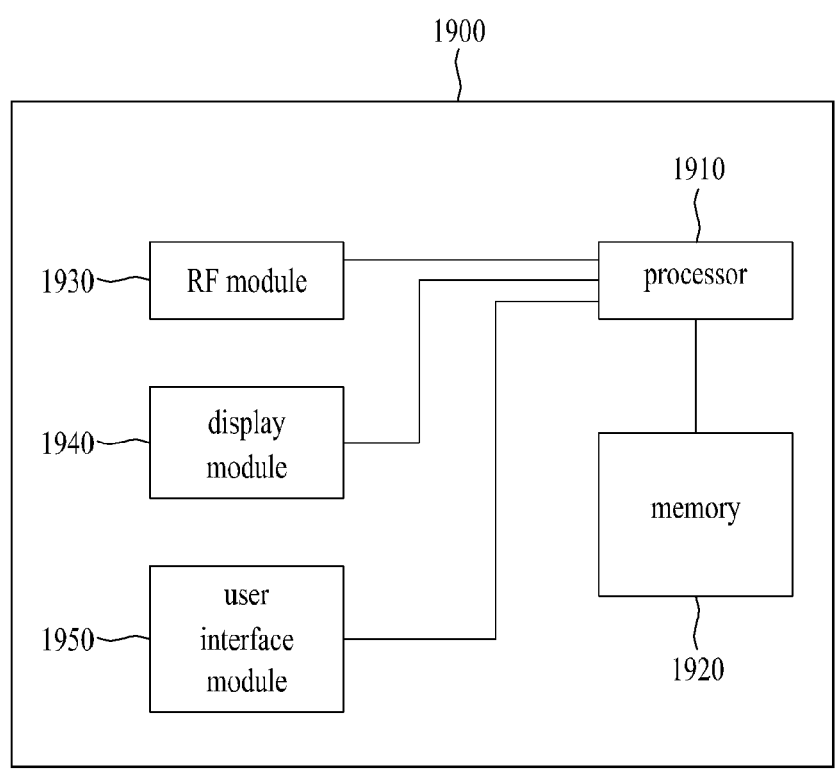
FIG. 19 is a block diagram of an apparatus for transmitting response information according to an embodiment of the present invention.

FIG. 19 is a block diagram of a communication apparatus according to an embodiment of the present invention.

Referring to FIG. 19, a communication apparatus 1900 includes a processor 1910, a memory 1920, a Radio Frequency (RF) module 1930, a display module 1940 and a user interface module 1950.

The communication apparatus 1900 is shown for convenience of description and some modules thereof may be omitted. In addition, the communication apparatus 1900 may further include necessary modules. In addition, some modules of the communication apparatus 1900 may be subdivided. For example, the processor may further include a coding module for coding response information and a scrambling module for scrambling response information. The processor 1910 is configured to perform an operation of the embodiment of the present invention described with respect to the drawings. For a detailed description of the operation of the processor 1910, reference may be made to the description associated with FIGS. 1 to 18.

The memory 1920 is connected to the processor 1910 so as to store an operating system, an application, program code, data and the like. The RF module 1930 is connected to the processor 1910 so as to perform a function for converting a baseband signal into a radio signal or converting a radio signal into a baseband signal. The RF module 1930 performs analog conversion, amplification, filtering and frequency up-conversion or inverse processes thereof. The display module 1940 is connected to the processor 1910 so as to display a variety of information. As the display module 1940, although not limited thereto, a well-known device such as a Liquid Crystal Display (LCD), a Light Emitting Diode (LED), or an Organic Light Emitting Diode (OLED) may be used. The user interface module 1950 is connected to the processor 1910 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system. More specifically, if multiplexing is performed using the method proposed by the present invention, the following effects are obtained.

(1) The number of bundled HARQ-ACK blocks may be sent through only one scrambling process.

(2) If a start point of a scrambling sequence is differently applied to antennas (or layers), it is possible to prevent undesirable beamforming.

The invention claimed is:

1. A method for transmitting response information for a plurality of bundled information blocks in a wireless system of a time division duplex (TDD) mode, the method comprising:
coding the response information for the plurality of bundled information blocks;
scrambling the coded response information; and
transmitting the scrambled response information to a base station,
wherein, in the scrambling, if some bits of the coded response information are information bits indicating acknowledgement (ACK)/negative acknowledgement (NACK) on the downlink data, the coded response information b(i) is scrambled using a specific scrambling sequence according to the following equation:

$$\tilde{b}(i)=(b(i)+c(i))\bmod 2,$$

wherein b(i) denotes the coded response information, $\tilde{b}(i)$ denotes the scrambled response information, and c(i) denotes the specific scrambling sequence, and
wherein the specific scrambling sequence has an initial value determined by the number of bundled information blocks.

2. The method according to claim 1, wherein the specific scrambling sequence c(i) is a pseudo-random sequence.

3. The method according to claim 1, wherein, if the number of bundled information blocks is k, the start point of the specific scrambling sequence c(i) is shifted by any one of c(i−k+1) or c(i+k−1).

4. The method according to claim 1, wherein, if the number of bundled information blocks is k, the start point of the specific scrambling sequence c(i) is shifted by any one of c(i−a(k−1)) or c(i+a(k−1)), and a is an arbitrary constant.

5. The method according to claim 4, wherein a is any one of a factor of 2 or the length of the response information.

6. The method according to claim 1, wherein:
the transmitting includes transmitting the generated response information to the base station through a plurality of antennas, and
the scrambling includes scrambling the coded response information using a specific scrambling sequence corresponding to each of the plurality of antennas.

7. An apparatus for transmitting response information for a plurality of bundled information blocks in a wireless system of a time division duplex (TDD) mode, the apparatus comprising:
a coding module configured to code the response information for the plurality of bundled information blocks;
a scrambling module configured to scramble the coded response information; and
a radio frequency (RF) module configured to transmit the scrambled response information to a base station,
wherein, if some bits of the coded response information are information bits indicating acknowledgement (ACK)/ negative acknowledgement (NACK) on the downlink data, the scrambling module is configured to scramble the coded response information b(i) using a specific scrambling sequence according to the following equation:

$$\tilde{b}(i)=(b(i)+c(i))\bmod 2,$$

wherein b(i) denotes the coded response information, $\tilde{b}(i)$ denotes the scrambled response information, and c(i) denotes the specific scrambling sequence, and
wherein the specific scrambling sequence has an initial value determined by the number of bundled information blocks.

8. The apparatus according to claim 2, wherein the specific scrambling sequence c(i) is a pseudo-random sequence.

9. The apparatus according to claim 7, wherein, if the number of bundled information blocks is k, the start point of the specific scrambling sequence c(i) is shifted by any one of c(i−k+1) or c(i+k−1).

10. The apparatus according to claim 7, wherein, if the number of bundled information blocks is k, the start point of the specific scrambling sequence c(i) is shifted by any one of c(i−a(k−1)) or c(i+a(k−1)), and a is an arbitrary constant.

11. The apparatus according to claim 10, wherein a is any one of a factor of 2 or the length of the response information.

12. The apparatus according to claim 7 wherein:
the RF module is configured to transmit the generated response information to the base station through a plurality of antennas, and
the scrambling module is configured to scramble the coded response information using a specific scrambling sequence corresponding to each of the plurality of antennas.

* * * * *